US005652924A

United States Patent [19]
Yamano

[11] Patent Number: 5,652,924
[45] Date of Patent: Jul. 29, 1997

[54] AUTOMATIC FOCUS ADJUSTMENT DEVICE AND FOCUS ADJUSTMENT METHOD

[75] Inventor: Shozo Yamano, Tokyo, Japan

[73] Assignee: Nikon Corp., Tokyo, Japan

[21] Appl. No.: 496,782

[22] Filed: Jun. 29, 1995

[30] Foreign Application Priority Data

Sep. 30, 1994 [JP] Japan .................. 6-261545

[51] Int. Cl.$^6$ .............. G03B 3/10; G03B 13/34; G03B 15/16; G03B 39/00
[52] U.S. Cl. .................................. 396/95
[58] Field of Search ............... 354/400–409; 396/95, 89

[56] References Cited

U.S. PATENT DOCUMENTS

| | | | |
|---|---|---|---|
| 5,061,951 | 10/1991 | Higashihara et al. | 354/400 |
| 5,089,843 | 2/1992 | Higashihara et al. | 354/402 |
| 5,270,763 | 12/1993 | Ogasawara | 354/402 |
| 5,327,190 | 7/1994 | Nakamura et al. | 354/402 |
| 5,392,088 | 2/1995 | Abe et al. | 354/402 |
| 5,434,621 | 7/1995 | Yu | 348/347 |

*Primary Examiner*—Safet Metjahic
*Assistant Examiner*—Eric Nelson
*Attorney, Agent, or Firm*—Oliff & Berridge

[57] ABSTRACT

An automatic focus adjustment device is provided for focusing on a moving object with precision. The automatic focus adjustment device includes a photographic lens driver assembly to vary the forwarding amount of the phototaking lens assembly. A focus detection assembly detects the defocus amount of the subject image plane. An image plane velocity computation assembly computes the moving velocity of the subject image plane based on the defocus amount. A lens drive control assembly controls the photographic lens driver assembly based on the moving velocity of the subject image plane and the defocus amount. An adaptive controller reduces an instruction amount corresponding to the defocus amount for controlling focus adjustment when the detected defocus amount and the computed moving velocity have opposite arithmetic signs.

17 Claims, 9 Drawing Sheets

AUTOMATIC FOCUS ADJUSTMENT DEVICE AND FOCUS ADJUSTMENT METHOD

BACKGROUND OF THE INVENTION

1. Field of the Invention

The present invention relates to an automatic focus adjustment device and an automatic focus adjustment method to automatically focus on a moving subject.

2. Discussion of Related Art

Automatic focus adjustment methods for automatically adjusting focusing on a moving subject are known. FIG. 10 illustrates focus adjustment using a conventional automatic focus adjustment device. In FIG. 10, the horizontal axis indicates time and the vertical axis indicates, for example, a forwarding amount of a lens based on an infinite position. In FIG. 10, the thick line identifies the locus of the subject image surface (i.e., the locus of an ideal forwarding position of a lens that maintains a moving photographic subject constantly in focus). The thin line identifies the locus of the lens focus position (i.e., the locus of the forwarding amount of the actual lens position).

In general, the automatic focus adjustment device detects a defocus amount (i.e., position deviation) of the subject image surface based on a lens focus position of a phototaking lens assembly. The defocus amount and a sequential change amount of the defocus amount are fed back to a lens forwarding mechanism as control deviations to track the locus of the lens focus position on the locus of the subject image plane.

In this condition, when an actuator (i.e., a release button) is fully depressed at time Tnow, a defocus amount DEFx at exposure time Tex is linearly estimated based on a defocus amount detected before release of the release button and a sequential change amount of the defocus amount. The lens focusing position is changed by DEFx by controlling the lens forwarding mechanism. The lens focus position is then adjusted to a predicted position of the subject image plane at exposure time Tex.

In the conventional automatic focus adjustment devices, however, an overrun condition occurs in the direction of movement of the subject image plane during focus adjustment, as described in FIG. 10. When the defocus amount exceeds a value considered to be in focus at time Tover, the automatic focus adjustment device temporarily stops driving the lens. The lens driving is not resumed until the next distance measurement result is obtained. This stoppage produces a delay and furthermore fails to smoothly adjust the focus position. Furthermore, the repeated driving and stopping of the lens consumes a large amount of power resulting in rapid depletion of the battery. Additionally, during full depression of the release button, a deceleration period is necessary for stopping the lens forwarding mechanism with superior precision at a predicted position of the subject image plane.

Due to the above-stated problems, the desired driving amount of a phototaking lens assembly by the lens forwarding mechanism for a subject moving with a high velocity is not realized during a limited time (e.g., between Tnow to Tex in FIG. 10). As a result, proper focus adjustment at exposure time Tex is impossible.

SUMMARY OF THE INVENTION

It is an object of embodiments of the present invention to solve the above-identified problems with the conventional focus adjustment device by providing an automatic focus adjustment device and a focusing adjustment method to focus smoothly with superior precision on a moving subject.

Embodiments of the present invention are directed to an automatic focus adjustment device and method for adjusting a focus position to focus a moving subject image plane.

The focus adjustment device includes a phototaking lens assembly, a photographic lens driver assembly, a focus detection device, an adjustment controller and a lens driving controller. The phototaking lens assembly forms a subject image plane from light rays from a photographic subject. The photographic lens driver assembly moves the phototaking lens assembly a forwarding amount to the focus position. The focus detection assembly periodically detects the defocus amount of the subject image plane formed by the phototaking lens assembly. The adjustment controller is coupled to the focus detection assembly and determines the defocus amount and a velocity of the subject image plane. The lens driving controller is coupled to the photographic lens driver assembly and the adjustment controller. The lens driving controller controls the photographic lens driver assembly to perform automatic focus adjustment. The lens driving controller controls the photographic lens driver assembly based upon the defocus amount detected by the focus detection assembly and the computed velocity of the subject image plane.

The adjustment controller determines whether the subject image plane is moving. The adjustment controller includes an image plane velocity computation assembly that determines or computes the velocity of the subject image plane based on the defocus amount detected by the focus detection assembly. The adjustment controller then determines whether the subject image plane is moving based upon the computed velocity of the subject image plane.

The lens driving controller controls the operation of the photographic lens driver assembly based upon signals from the adjustment controller. The adjustment controller also includes an adaptive controller that adjusts an instruction amount corresponding to the defocus amount to be given to the photographic lens driver assembly for controlling focus adjustment when the defocus amount detected by the focus detection assembly and the computed image plane velocity have opposite arithmetic signs. The opposite arithmetic signs occur when the focusing position is ahead of the subject image plane in the direction of movement, as described above. The adaptive controller maintains the condition as a position deviation in which the focusing position is ahead of the subject image plane by reducing the instruction amount against the defocus amount. This adjustment permits the adjustment controller to smoothly execute focus adjustment.

When the release button is fully depressed in such a condition, the defocus amount between the predicted position of the subject image plane at the time of exposure and the focusing position at the present time becomes small. Thus, immediate completion of adjustment of the focusing position is possible at the time of exposure. Moreover, even if the photographic subject is moving with a very high velocity, because the focusing position is ahead of the subject image plane in the direction of movement, the defocus amount at the time of exposure is small, enabling accurate focus adjustment. By maintaining a condition in which the focus position stays ahead of the subject image plane in the direction of movement, sudden stopping of the driving of the lens is prohibited, enabling smooth focus adjustment and a substantial reduction in the power used for driving the lens.

The adaptive controller also reduces an absolute value of the moving velocity when the detected defocus amount and the computed image plane velocity have opposite arithmetic signs and the defocus amount exceeds a predetermined amount. The adaptive controller smoothly reduces the forwarding velocity of the phototaking lens assembly by reducing the absolute value of the moving velocity of the subject image plane when the focusing position is ahead of the subject image plane in the direction of movement and the defocus amount exceeds a predetermined value. This permits a smooth execution of focus adjustment. When the defocus amount exceeds the predetermined amount in this manner, the forwarding velocity of the phototaking lens assembly is reduced, enabling even smoother focus adjustment and increasing the stability of the focus adjustment device.

The method for automatically adjusting a focus position to focus a moving subject image plane includes periodically detecting a defocus amount of a subject image plane formed by the phototaking lens assembly. The image plane velocity of the subject image plane is determined or computed based on sequential changes of the defocus amount. The focus position of the phototaking lens assembly is then adjusted based upon the detected defocus amount and the computed image plane velocity.

The method further includes determining whether the subject image plane is moving. When the subject image plane is moving the arithmetic signs of the detected defocus amount and the computed image plane velocity are compared to determine if any adjustments to the data used for controlling the movement of the focus position are necessary when moving the focus position of the phototaking lens assembly.

An instruction amount corresponding to the defocus amount for controlling adjustment of the focus position is adjusted when the detected defocus amount and the computed image plane velocity have opposite arithmetic signs. The absolute value of the moving velocity of the subject image plane is reduced when the detected defocus amount and the computed image plane velocity have opposite arithmetic signs and the detected defocus amount exceeds a predetermined amount.

By controlling focus adjustment based on these values, the moving velocity of the phototaking lens assembly is reduced smoothly and focus is adjusted smoothly with the focus position ahead of the subject image plane in the direction of movement.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
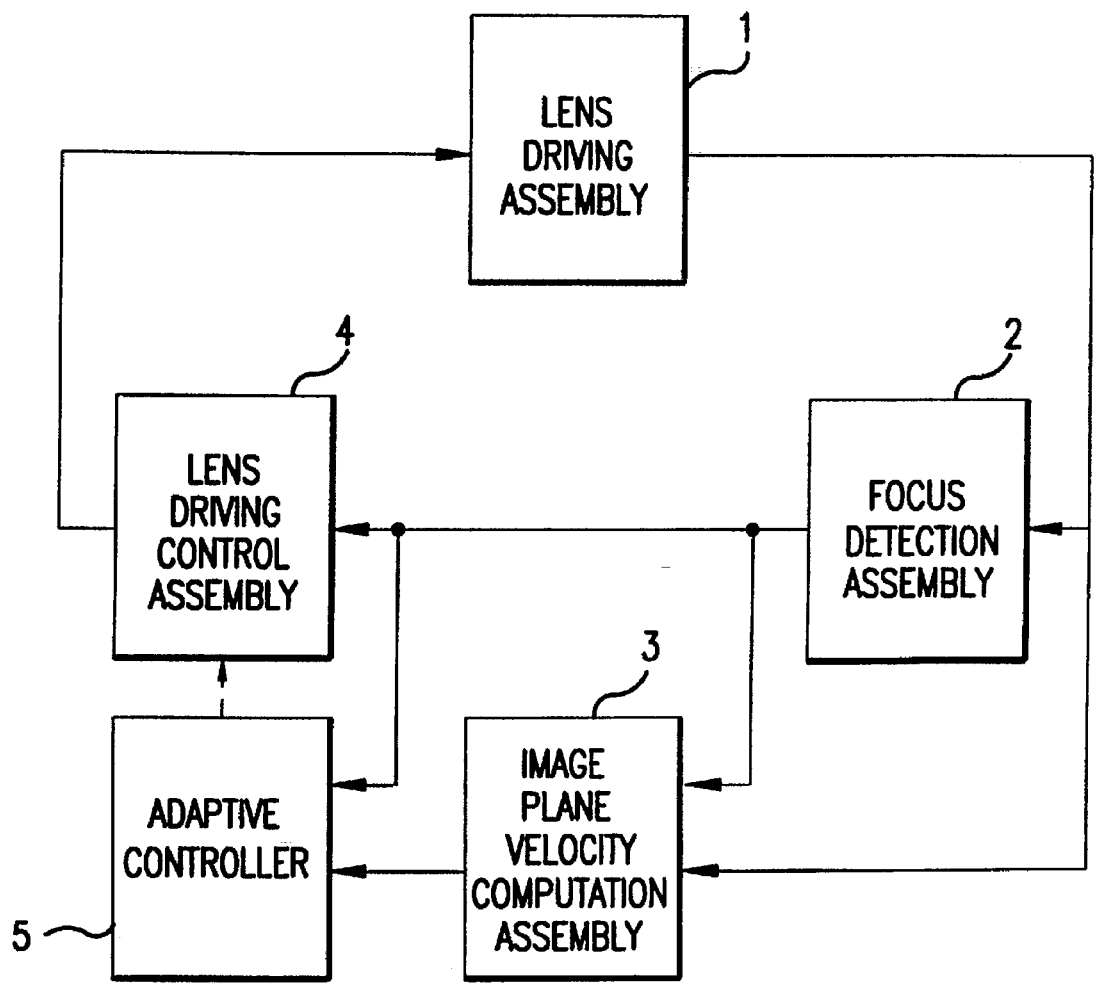
FIG. 1 is a block diagram of an embodiment of an automatic focus adjustment device of the present invention.
Figure 2:
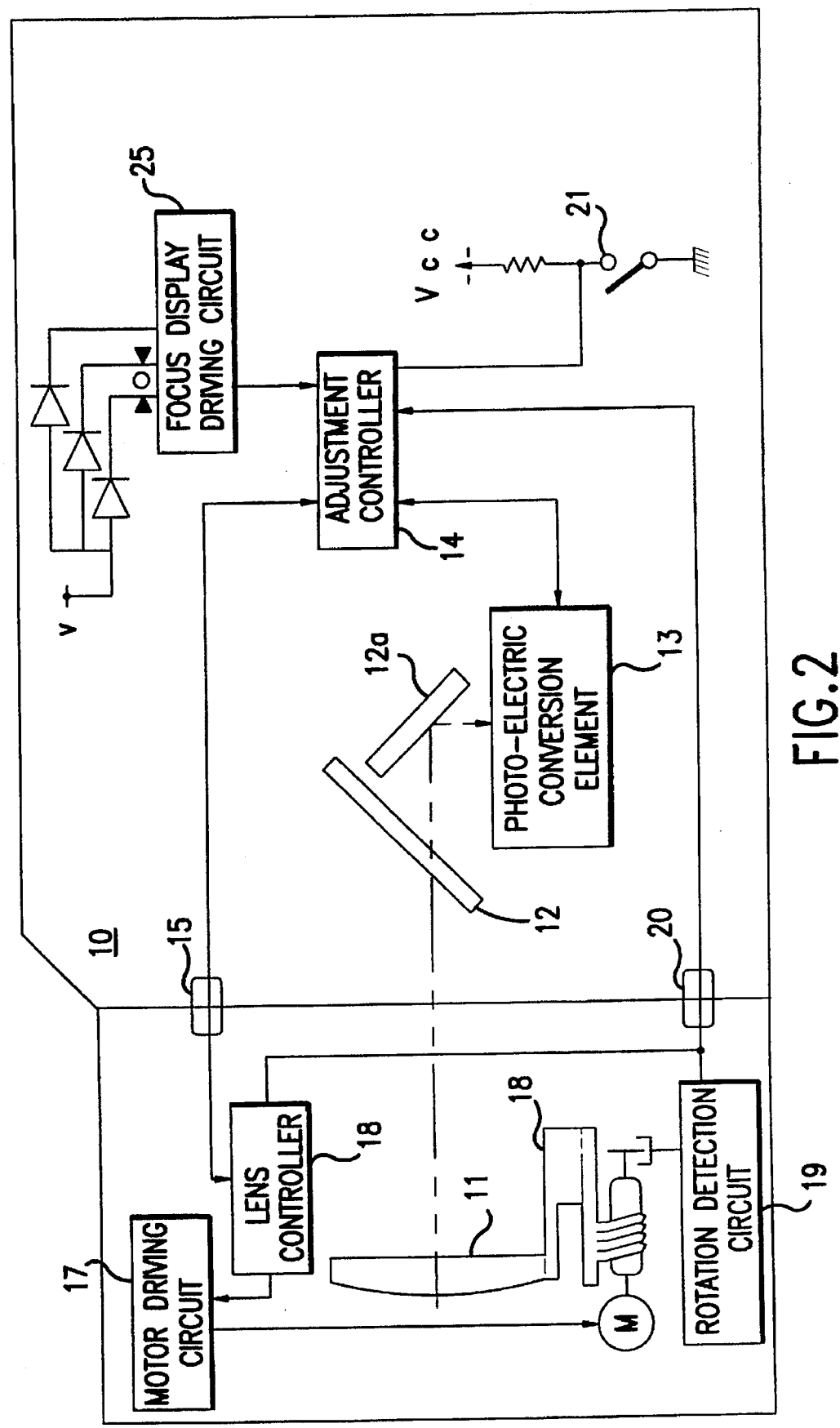
FIG. 2 is a schematic view of a camera having the automatic focus adjustment device according to an embodiment of the present invention.

FIG. 1 is a block diagram describing the automatic focus adjustment device of an embodiment of the present invention. FIG. 2 depicts a camera equipped with the automatic focus adjustment device of FIG. 1. A lens driving assembly 1, as shown in FIG. 1, changes the forwarding amount of a phototaking lens assembly 11, shown in FIG. 2. The lens driving assembly 1 includes a motor driving circuit 17, a motor M and a lens driving mechanism 18, as shown in FIG. 2.

A focus detection assembly 2 detects a defocus amount. The focus detection assembly 2 includes a photo-electric conversion element 13 and an adjustment controller 14. The defocus amount detected by the focus detection assembly 2 is transmitted to an image plane velocity computation assembly, an adaptive controller 5 and a lens driving control assembly 4. The lens driving control assembly 4 includes a lens controller or lens CPU 16. The lens driving control assembly 4 controls the operation of the lens driving assembly 1 by transmitting a drive instruction amount to the lens driving assembly 1. An adjustment controller 14 includes the image plane velocity computation assembly 3 and the adaptive controller 5. The image plane velocity computation assembly 3 determines or computes a moving velocity of a subject image plane. The adaptive controller 5 adjusts the instruction amount sent to the lens driving assembly 1 in some circumstances, as discussed below.

As shown in FIG. 2, the phototaking lens assembly 11 is attached to a camera assembly 10. A quick return mirror 12 and a sub-mirror 12a are positioned within the camera assembly 10 along an optical axis of the phototaking lens assembly 11. The photo-electric conversion element 13 is positioned in a light path reflected from the sub-mirror 12a. The adjustment controller 14 is connected to an output terminal of the photo-electric conversion element 13.

The lens controller 16 is connected to the adjustment controller 14 through a connector 15. An output terminal of the lens controller 16 is connected to the lens driving mechanism 18 of the lens driving assembly 1 through a motor driving circuit 17.

A rotation detection circuit 19 is connected to the lens driving mechanism 18. The rotation detection circuit 19 generates a series of pulses corresponding to a motor driving amount to detect the forwarding amount of the phototaking lens assembly 11. The lens controller 16 and the adjustment controller 14 are connected to an output terminal of the rotation detection circuit 19. The adjustment controller 14 is connected to the output terminal through a connector 20. Additionally, a half-depression switch 21 and a focus display driving circuit 25 are connected to the adjustment controller 14.

Figure 3:
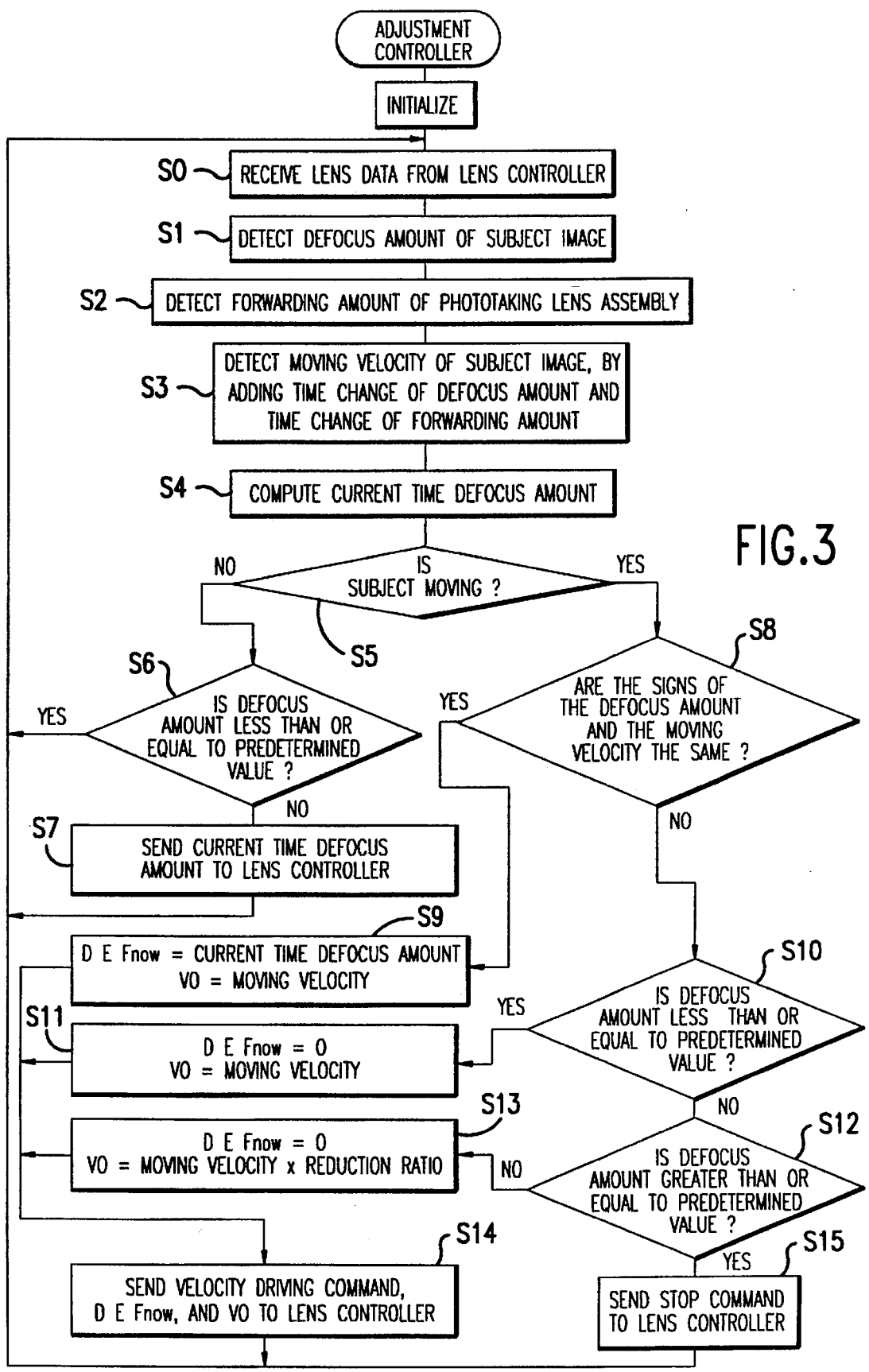
FIG. 3 is a flow chart depicting the camera assembly operation of the automatic focus adjustment device of FIG. 2.
Figure 4:
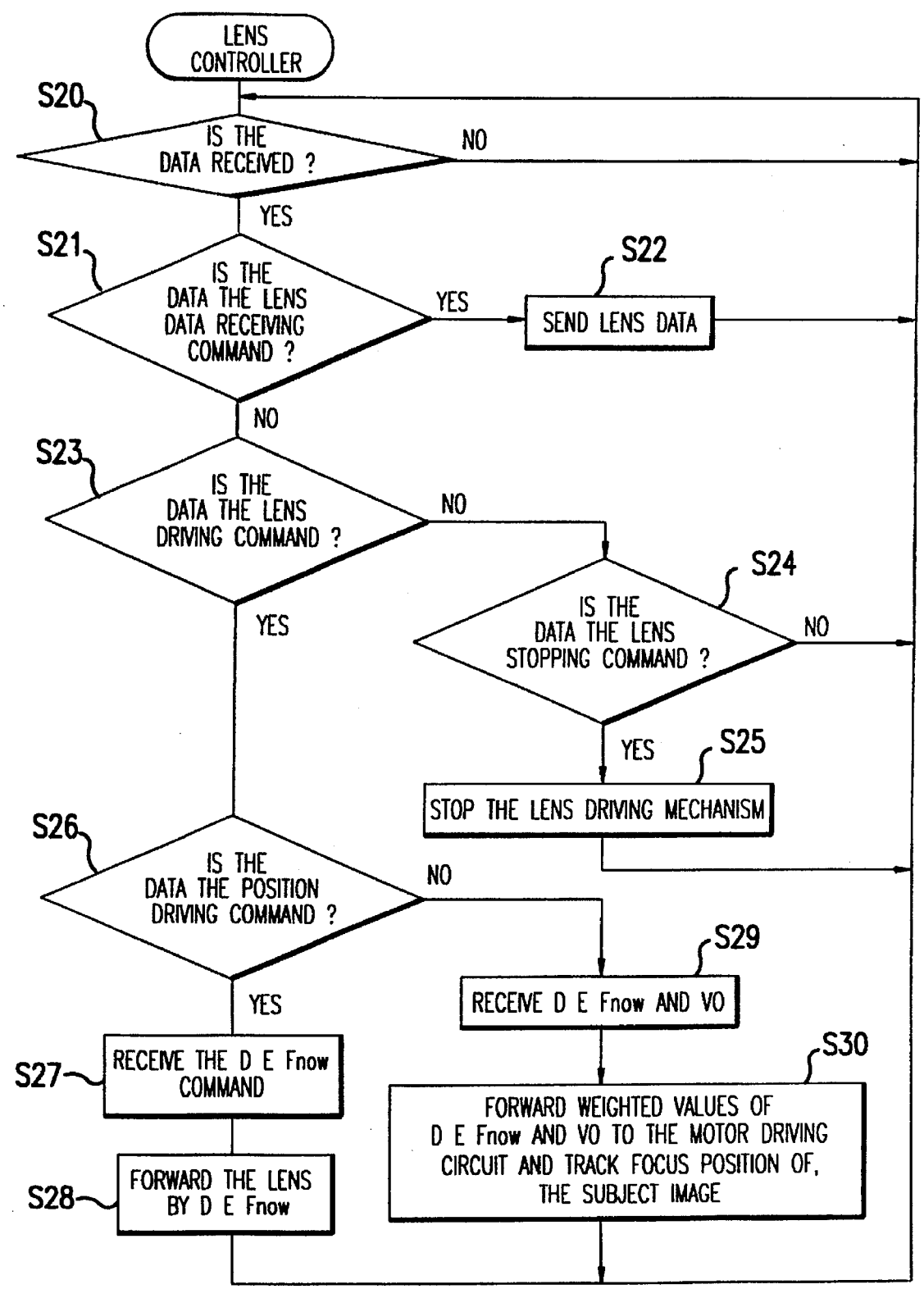
FIG. 4 is a flow chart depicting the lens assembly operation of the automatic focus adjustment device of FIG. 2.

The operation of the automatic focus adjustment device will now be described with reference to FIGS. 3 and 4. First, the operation of the camera assembly 10 will be described in connection with FIG. 3. The camera assembly 10 is turned on by operating an ON-OFF switch, not shown. The adjustment controller 14 is then activated and initialized. The initialization includes initializing memories and various function resources, such as, for example, an event count function, an external interruption function, an A/D conversion circuit, serial communication function, and an input/output port. The adjustment controller 14 is then in standby mode until the quick return mirror 12 is lowered to the position shown in FIG. 2.

In step S0, the adjustment controller 14 verifies that the quick return mirror 12 has been lowered. The adjustment controller 14 sends a lens receiving command to the lens controller 16 and obtains lens data unique to the phototaking lens assembly 11. Incident light rays from the phototaking lens assembly 11 pass through the quick return mirror 12 and are reflected by the sub-mirror 12a and irradiated on the photo-electric conversion element 13. In step S1, the adjustment controller 14 accepts the output from the photo-electric conversion element 13 and performs a phase shift detection to detect a defocus amount DEF0 at time T0, as described in FIG. 5. The adjustment controller 14 also stores a previous defocus amount DEF1 detected at a previous time T1.

Figure 5:
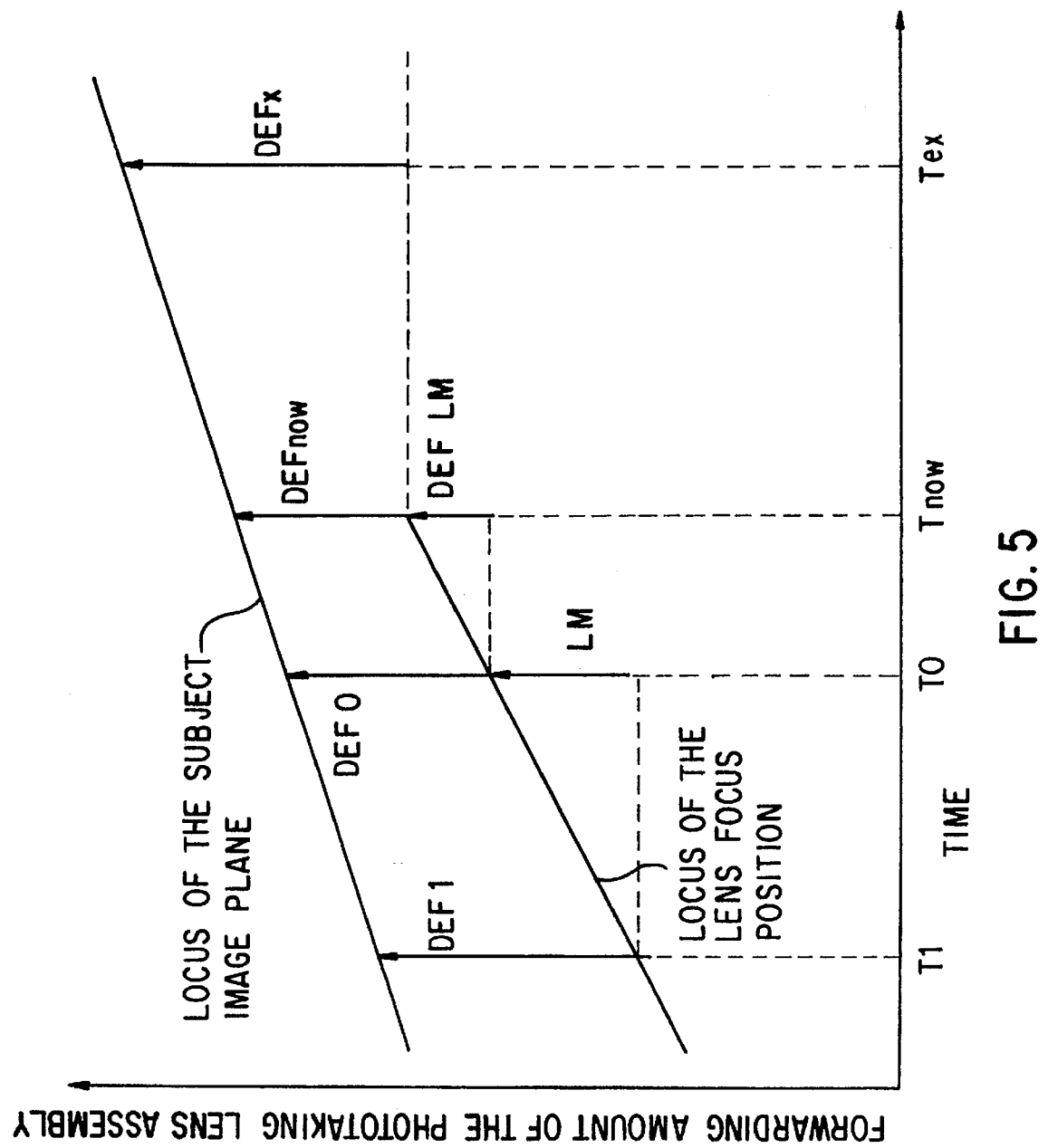
FIG. 5 is a graph that depicts the locus of a subject image plane.

In step S2, the adjustment controller 14 determines a displacement amount or forwarding amount LM of the phototaking lens assembly 11 between times T1 and T0, as shown in FIG. 5. The forwarding amount LM is obtained by first determining or computing the number of pulses entered from the rotation detection circuit 19 between times T1 and T0. The pulse number is then converted into a defocus amount unit using data including, for example, an image plane movement amount per pulse from the lens controller 16.

In step S3, the velocity V0 of the subject image plane with respect to the focus position of the phototaking lens assembly 11 is determined by the image plane velocity computation assembly 3 of the adjustment controller 14.

$$V0 = DEF0 + LM - DEF1 \quad (1)$$

The forwarding amount LMnow of the phototaking lens assembly 11 from time T0 to the current time Tnow, as shown in FIG. 5, is obtained by determining or computing the number of pulses entered from the rotation detection circuit 19 between times T0 and Tnow. This pulse number is converted into a defocus amount unit in a similar manner as described above in connection with the forwarding amount LM. Using the velocity V0 and the forwarding amount LMnow of the phototaking lens assembly 11 from the time T0 to the current time Tnow, the defocus amount DEFnow at the current time Tnow is determined or computed in step S4.

$$DEFnow = (Tnow - T0) * V0 + DEF0 - LMnow \quad (2)$$

Figure 6A:
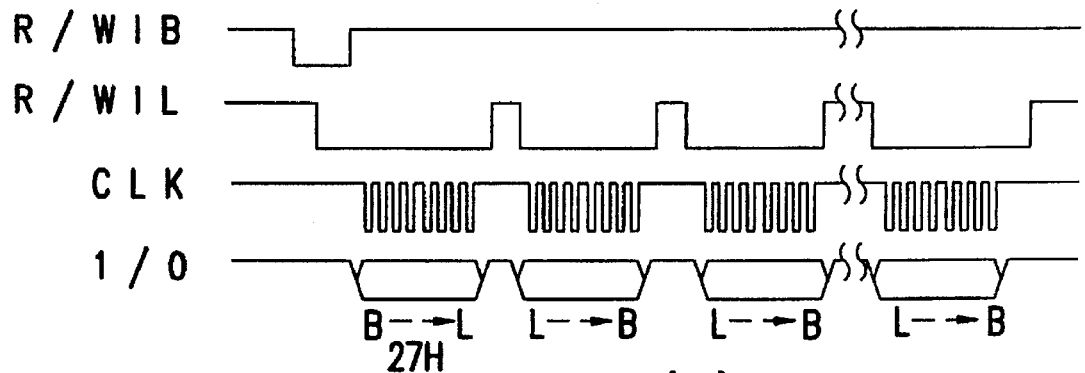
FIG. 6(a) is a schematic drawing of the lens data receiving command communication wave patterns.
Figure 6B:
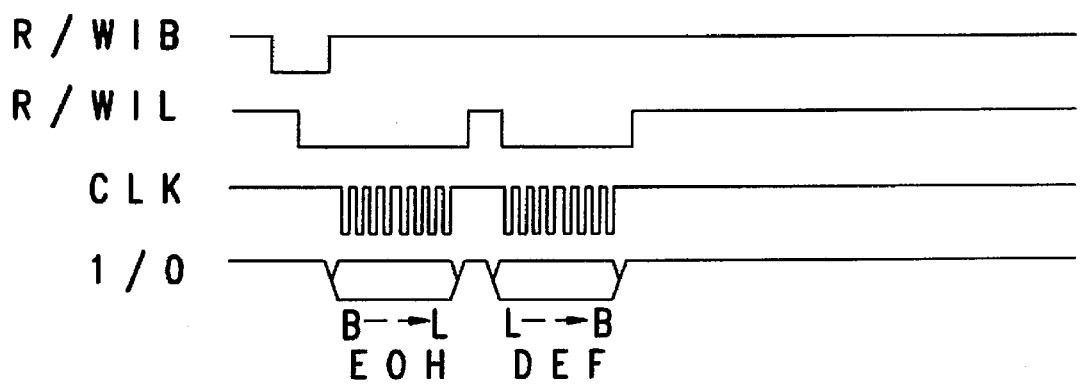
FIG. 6(b) is a schematic drawing of the position driving command communication wave patterns.

In step S5, the adjustment controller 14 determines whether the subject image plane is moving. When the velocity V0 of the subject image plane obtained above is small, the subject image plane and the photographic subject are considered to be still. The operation of the focus adjustment device proceeds to step S6. In step S6, the defocus amount DEFnow is compared to a predetermined value. When the defocus amount DEFnow is less than or equal to the predetermined value, the operation of the focus adjustment device returns to the standby mode. When the defocus amount DEFnow is greater than the predetermined value, the operation of the focus adjustment device proceeds to step S7. In step S7, a position driving command, shown, for example, in FIG. 6(b), and the defocus amount DEFnow are sent to the lens controller 16, as described in FIG. 6(b). The lens controller 16 executes focus adjustment. The focus position of the phototaking lens assembly 11 is forwarded by the defocus amount DEFnow.

In step S5, when the photographic subject is a moving body, the operation of the focus adjustment device proceeds to step S8. In step S8, the arithmetic sign of the defocus amount DEFnow and the arithmetic sign of the velocity V0 of the subject image plane are compared. By controlling the focus adjustment of the photographic lens assembly 11 based upon the defocus amount DEFnow and the velocity V0 of the subject image plane, sudden stopping of the driving of the phototaking lens assembly 11 is prevented. This sudden stopping is also avoided when the focus position overruns the direction of movement of the subject image surface. This permits smooth execution of focus adjustment and a substantial reduction of the electrical power needed for driving the phototaking lens assembly 11.

Figure 6C:
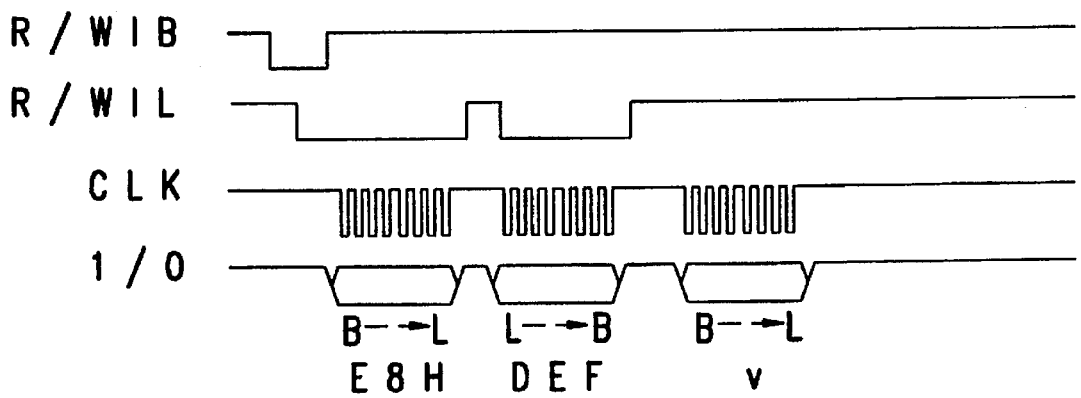
FIG. 6(c) is a schematic drawing of the velocity driving command communication wave patterns.

When the arithmetic signs of DEFnow and V0 are the same (i.e., both positive or both negative), the operation of the focus adjustment device proceeds to step S9. In step S9, DEFnow is set as the present time defocus amount and the velocity V0 is set as the moving velocity. The operation then proceeds to step S14 where a velocity driving command, as shown, for example, in FIG. 6(c), the defocus amount DEFnow, and the velocity V0 are sent to the lens controller 16. The lens controller 16 then executes focus adjustment.

When the arithmetic signs of DEFnow and V0 are different (i.e., one positive and one negative), the operation of the focus adjustment device proceeds to step S10. In step S10, the defocus amount DEFnow is compared to a predetermined amount such as, for example, 100 μm. The predetermined value is not limited to 100 μm. Any value within a range considered to be in focus can be used depending on the field depth of the phototaking lens assembly 11 and if the focus position can be adjusted while maintaining an in-focus condition using the predetermined value.

When the defocus amount DEFnow is less than or equal to the predetermined value, the defocus amount DEFnow is reset to zero in step S11. The velocity V0 is set as the moving velocity. The operation then proceeds to step S14 where the velocity driving command, the defocus amount DEFnow, and the velocity V0 are sent to the lens controller 16. The lens controller 16 controls the forwarding velocity of the phototaking lens assembly 11 to follow the velocity V0 as a target value and maintains the defocus amount DEFnow with the focus position ahead of the subject image plane in the direction of movement.

Figure 7:
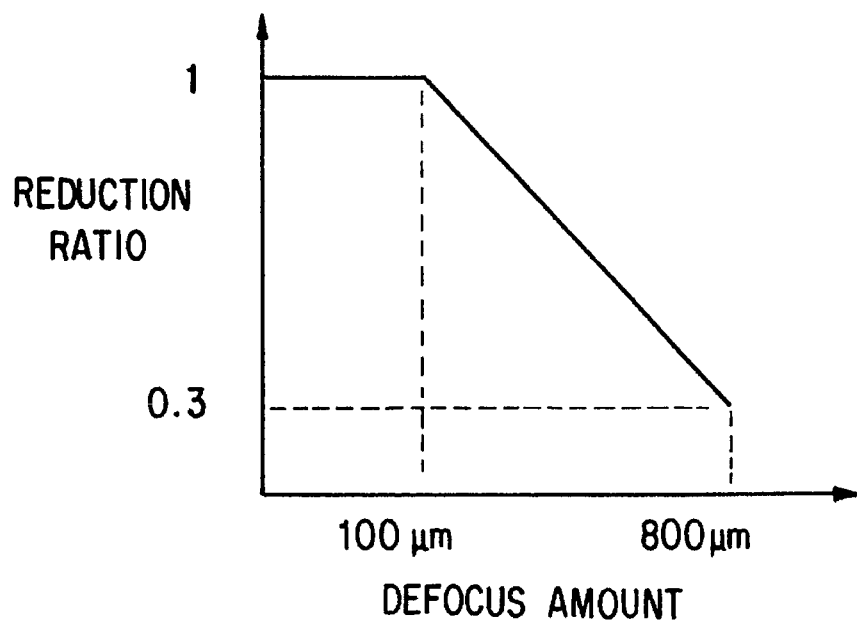
FIG. 7 is a graph that describes a relationship between the defocus amount and the reduction ratio.

In step S10, when the defocus amount is greater than the predetermined value, the operation of the focus adjustment device proceeds to step S12 where the defocus amount DEFnow is compared to a second predetermined value such as, for example, 800 μm. When the defocus amount DEFnow is less than the second predetermined value, the moving velocity is multiplied in step S13 by a previously established reduction ratio corresponding to the defocus amount DEFnow, as shown, for example, in FIG. 7, and the defocus value DEFnow is reset to zero. The velocity driving command, the defocus amount DEFnow, and the adjusted velocity V0 are then sent to the lens controller 16 in step S14. The absolute value of the velocity V0 (i.e., the target value) is reduced by the reduction ratio. This reduction, also, gradually reduces the forwarding velocity of the phototaking lens assembly 11. This reduction in the forwarding velocity increases the stability of the focus adjustment device more smoothly while executing focus adjustment.

In step S12, when the defocus amount DEFnow is greater than or equal to the second predetermined value, the operation of the focus adjustment device proceeds to step S15. In step S15, a stop command is sent to the lens controller 16. The operation of the focus adjustment device then returns to the standby mode. The focus adjustment device repeats these operations prior to each focusing operation.

The operation of the lens controller 16 will now be described in connection with FIG. 4. In step S20, data is received from the controller 14. A determination is made in step S21 whether the data received in step S20 is a lens data receiving command, shown, for example, in FIG. 6(a). If the data is the lens data receiving command, then the lens controller 16 sends the lens data of the phototaking lens assembly 11 to the adjustment controller 14 in step S22.

In step S21, when the data received is not the lens data receiving command, the operation of the lens controller 16 of the focus adjustment device proceeds to step S23. In step S23, a determination is made whether the data received is the lens driving command. If the data is not the lens driving command, then a determination is made in step S24 whether the data is the lens stopping command (i.e., the lens stopping command from step S15). When the lens stopping command is received, the lens driving mechanism 18 is stopped in step S25.

Figure 8:
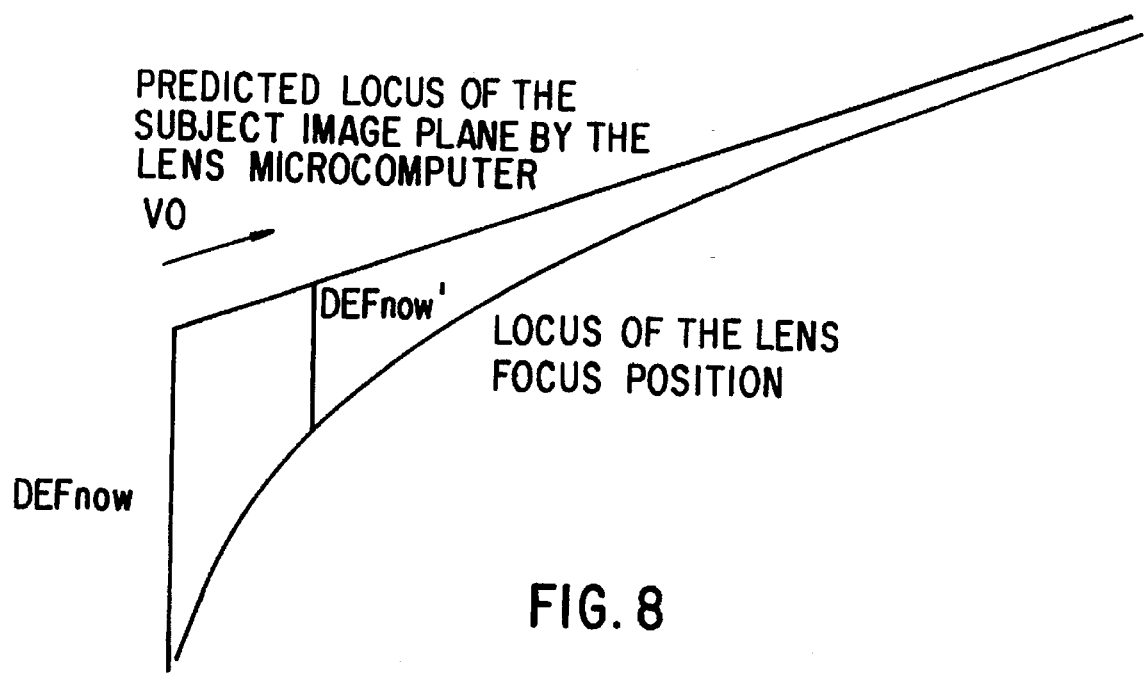
FIG. 8 is a schematic depiction of a control operation by a velocity driving command of the lens control unit.

In step S23, when the received data includes the velocity driving command, the operation of the focus adjustment device proceeds to step S26. In step S26, a determination is made whether the received data includes the position driving command. When the data does not include the position driving command, the operation proceeds to step S29. In step S29, the lens controller 16 receives the defocus amount DEFnow and velocity V0 from the adjustment controller 14. In step S30, the lens controller 16 estimates linearly the defocus amount DEFnow' of the subject image plane, as described, for example, in FIG. 8. The lens controller 16 tracks the locus of the focus position onto the locus of the subject image. This tracking is estimated linearly within the lens controller 16 based upon the defocus amount DEFnow and the velocity V0 sent from the adjustment controller 14. The lens controller 16 then computes the duty cycle ratio PWMduty from:

$$PWMduty = \alpha*DEFnow' + \beta*(V0-V) + \Gamma \quad (3)$$

wherein $\alpha$ and $\beta$ represent feedback gain, $\Gamma$ represents other control factors, and V represents the forwarding velocity of the phototaking lens assembly 11. The lens controller 16 using the duty cycle ratio PWMduty then feeds an instruction amount with pulse width modulation to the motor driving circuit 17 for moving the phototaking lens assembly.

In step S26, when the received data contains the position driving command, the operation of the lens controller 16 of the focus adjustment device proceeds to step S27. $\beta$ and $\Gamma$ in Equation 3 are reset to zero and the duty ratio PWMduty is computed using a feedback gain $\alpha$ having a different value. The forwarding of the phototaking lens assembly 11 by the defocus amount DEFnow is performed in step S28 by feeding the duty cycle ratio PWMduty back to the motor driving circuit 17.

Figure 9:
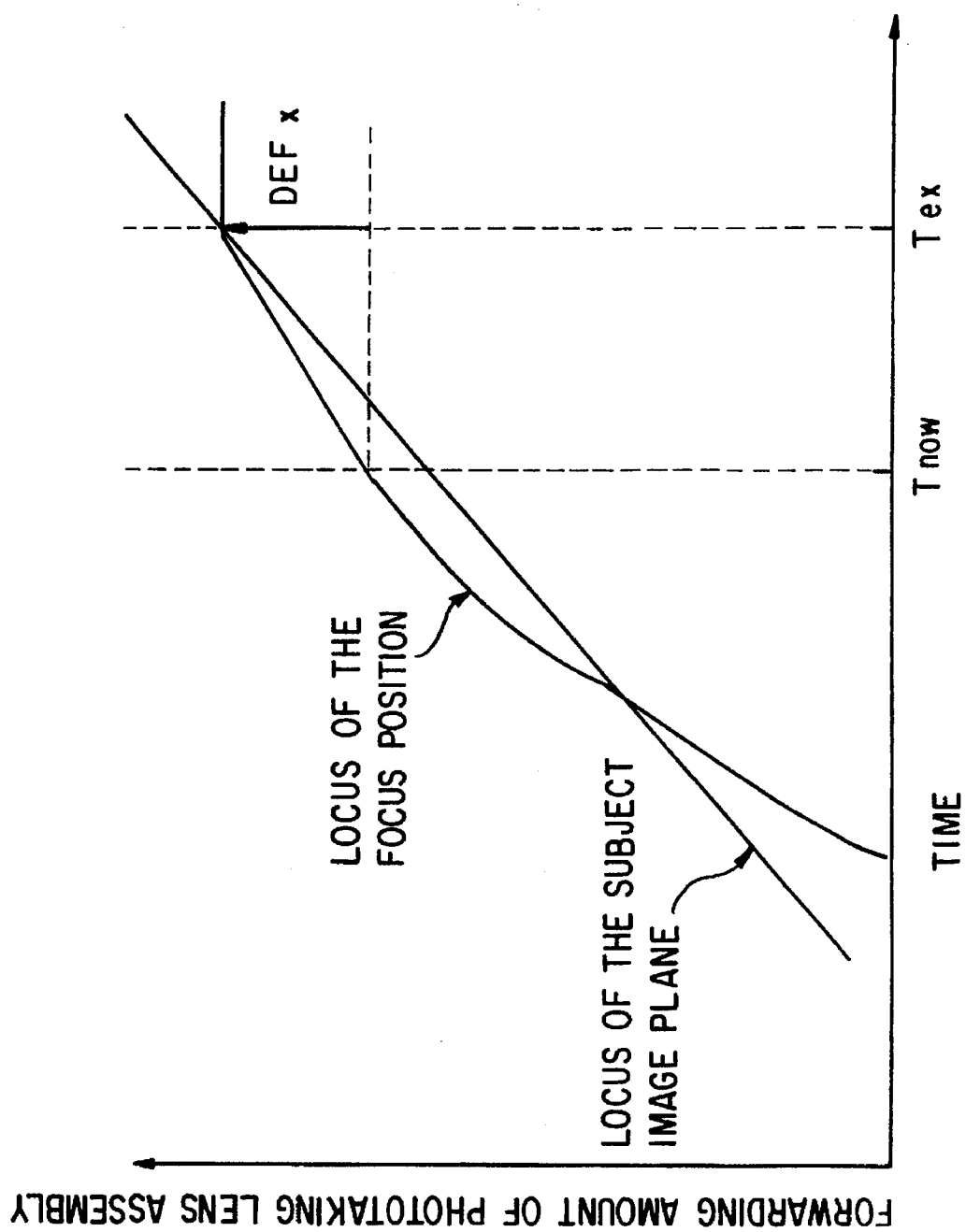
FIG. 9 is a graph that describes the focus adjustment according to the automatic focus adjustment device according to an of the embodiment present invention.
Figure 10:
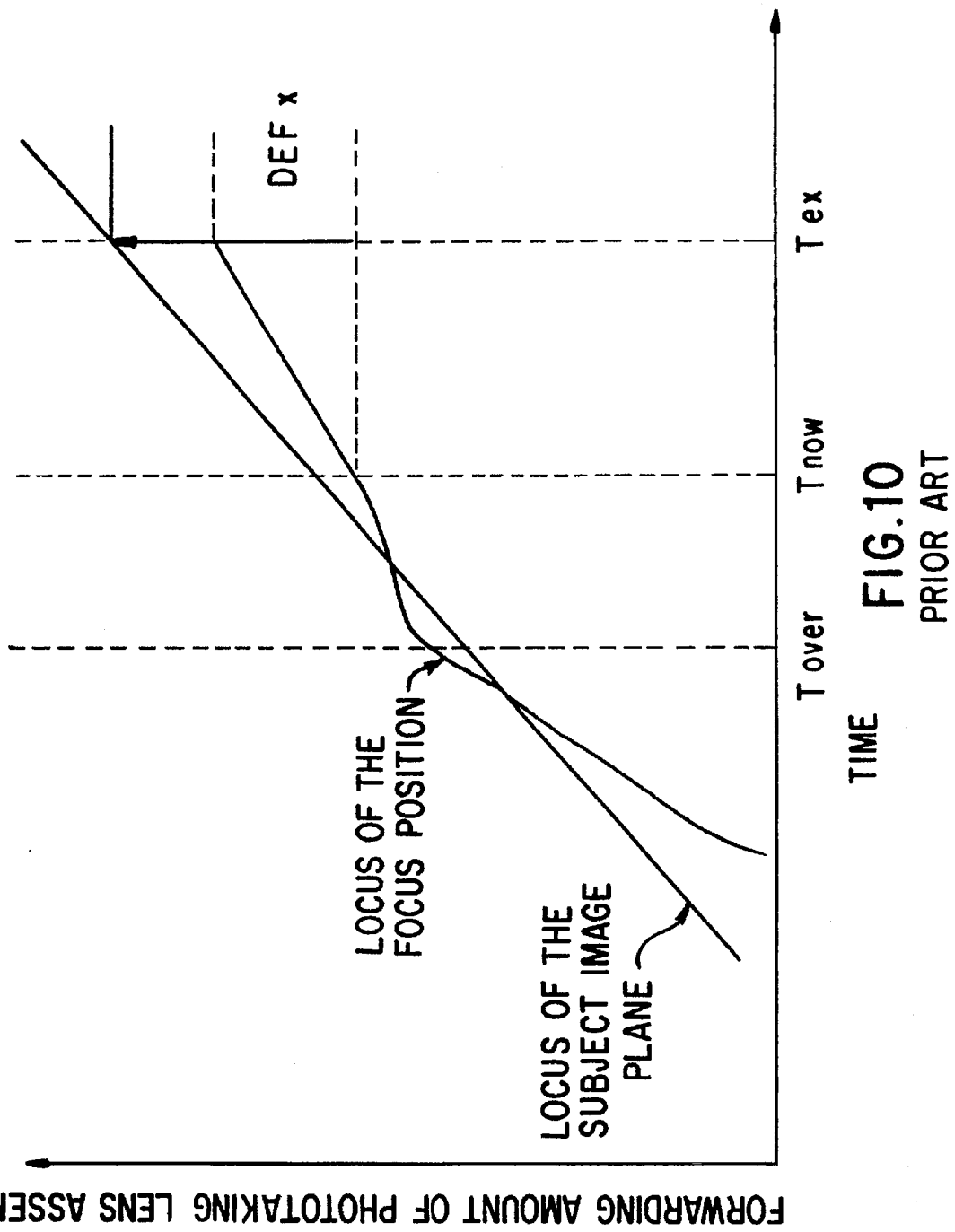
FIG. 10 is a graph explaining traditional focus adjustment.

The automatic focus adjustment device and the focus adjustment method according to the present invention maintain a defocus amount with the focus position ahead of the subject image plane in the direction of movement, as described in FIG. 9. The defocus amount DEFx between the focus position and the predicted position of the subject image plane at exposure is small. The small defocus amount permits quick and accurate completion of focus adjustment at the time of exposure.

Furthermore, even when the subject image plane is moving with a high speed, the focus position is always ahead of the photographic subject in the direction of movement. Thus, the defocus amount DEFx between the focus position and the predicted position of the subject image plane at the time of exposure is small. Therefore, the defocus at the time of exposure can be made small.

Since the focus position is maintained ahead of the photographic subject in the direction of movement, the driving of the phototaking lens assembly 11 is not suddenly stopped. This permits smooth execution of focus adjustment. Moreover, the smooth driving of the phototaking lens assembly 11 reduces the electric power needed to drive the phototaking lens assembly 11. This reduction in power usage results in a longer usage time for the battery in the camera assembly 10.

Furthermore, when the defocus amount exceeds a predetermined value, the adjustment controller 14 reduces the absolute value of the velocity of the subject image plane. This reduction gradually reduces the forwarding velocity of the phototaking lens assembly 11. This gradual reduction of the forwarding velocity substantially increases the stability of the focus adjustment device while adjusting the focus more smoothly.

In an embodiment of the present invention, the defocus amount sent to the lens controller 16 is reset to zero when the arithmetic signs of the defocus amount DEFnow and the velocity V0 differ. The present invention is not limited to this embodiment. It is equally permissible to offset the target position of the forwarding amount of the phototaking lens assembly 11 or to reduce the defocus amount sent to the lens controller 16. It is also permissible to change the predetermined value depending on the moving velocity of the subject image plane. In such an arrangement, the focus position stays ahead of the photographic subject according to the velocity of the subject image plane. This permits further reduction of the defocus amount at the time of exposure.

As explained above, the defocus amount is reduced by the adaptive controller 5. With such an arrangement, the driving of the phototaking lens assembly 11 does not suddenly stop even when the focus position is overrun in the direction of movement of the subject image plane. Therefore, smooth focus adjustment is achieved. The driving of the phototaking lens assembly 11 is smooth. The smooth driving of the phototaking lens assembly produces a large reduction of the electric power used for driving the phototaking lens assembly 11.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined by the following claims.

What is claimed is:

1. An automatic focus adjustment device for adjusting a focus position to focus a moving subject image plane, comprising:

a phototaking lens assembly that forms a subject image plane from light rays from a photographic subject;

a photographic lens driver assembly coupled to said phototaking lens assembly that moves said phototaking lens assembly a forwarding amount to the focus position;

a focus detection assembly that periodically detects a defocus amount of the subject image plane formed by said phototaking lens assembly;

an adjustment controller coupled to said focus detection assembly that determines the defocus amount and determines a velocity of the subject image plane, said adjustment controller includes an image plane velocity computation assembly that determines the velocity of the subject image plane based on the detected defocus amounts, wherein said adjustment controller determines whether the subject image plane is moving based upon the determined velocity of the subject image plane; and a lens driving controller coupled to said photographic lens driver assembly and said adjustment controller that controls said photographic lens driver assembly, wherein said lens driving controller controls said photographic lens driver assembly based upon the periodically detected defocus amounts and the determined velocity of the subject image plane;

wherein said lens driving controller sends a drive instruction amount to said photographic lens driver assembly to control focus adjustment, said adjustment controller further includes an adaptive controller that reduces the drive instruction amount corresponding to the defocus amount to be given to said photographic lens driver assembly when the detected defocus amount and the image plane velocity determined by said image plane velocity computation assembly have opposite arithmetic signs.

2. An automatic focus adjustment device for adjusting a focus position to focus a moving subject image plane, comprising:

a phototaking lens assembly that forms a subject image plane from light rays from a photographic subject;

a photographic lens driver assembly coupled to said phototaking lens assembly that moves said phototaking lens assembly a forwarding amount to the focus position;

a focus detection assembly that periodically detects a defocus amount of the subject image plane formed by said phototaking lens assembly;

an adjustment controller coupled to said focus detection assembly that determines the defocus amount and determines a velocity of the subject image plane, said adjustment controller includes an image plane velocity computation assembly that determines the velocity of the subject image plane based on the detected defocus amounts, wherein said adjustment controller determines whether the subject image plane is moving based upon the determined velocity of the subject image plane, and further includes an adaptive controller that reduces an absolute value of the moving velocity when the detected defocus amount and the image plane velocity of the subject image plane determined by said image plane velocity computation assembly have opposite arithmetic signs and the defocus amount exceeds a predetermined amount; and a lens driving controller coupled to said photographic lens driver assembly and said adjustment controller that controls said photographic lens driver assembly, wherein said lens driving controller controls said photographic lens driver assembly based upon the periodically detected defocus amounts and the determined velocity of the subject image plane.

3. An automatic focus adjustment device for adjusting a focus position to focus a moving subject image plane, comprising:

a phototaking lens assembly that forms a subject image plane from light rays from a photographic subject;

a photographic lens driver assembly coupled to said phototaking lens assembly that moves said phototaking lens assembly a forwarding amount to the focus position;

a focus detection assembly that periodically detects a defocus amount of the subject image plane formed by said phototaking lens assembly;

an adjustment controller coupled to said focus detection assembly that determines the defocus amount and determines a velocity of the subject image plane, said adjustment controller includes an image plane velocity computation assembly that determines the velocity of the subject image plane based on the detected defocus amounts, wherein said adjustment controller determines whether the subject image plane is moving based upon the determined velocity of the subject image plane, and further includes an adaptive controller that reduces an absolute value of the moving velocity when the detected defocus amount and the image plane velocity of the subject image plane determined by said image plane velocity computation assembly have opposite arithmetic signs; and a lens driving controller coupled to said photographic lens driver assembly and said adjustment controller that controls said photographic lens driver assembly, wherein said lens driving controller controls said photographic lens driver assembly based upon the periodically detected defocus amounts and the determined velocity of the subject image plane.

4. The automatic focus adjustment device according to claim 1, wherein said focus detection assembly includes a photo-electric conversion element.

5. An automatic focus adjustment device for adjusting a focus position to focus a moving subject image plane, comprising:

a phototaking lens assembly that forms a subject image plane from light rays from a photographic subject;

lens driver means coupled to said phototaking lens assembly for driving said phototaking lens assembly a forwarding amount to the focus position;

detection means for periodically detecting a defocus amount of the subject image plane formed by said phototaking lens assembly;

control means coupled to said detection means for determining the defocus amount and a velocity of the subject image plane, said control means determines the velocity of the subject image plane based on the defocus amount detected by said detection means, wherein said control means determines whether the subject image plane is moving based upon the determined velocity of the subject image plane; and lens driving control means coupled to said lens driver means and said control means for controlling said lens driver means based upon the defocus amount detected by said detection means and a computed velocity of the subject image plane;

wherein said lens driving control means uses a drive instruction amount to control focus adjustment and said control means reduces the drive instruction amount corresponding to the defocus amount for executing focus adjustment when the defocus amount detected by said detection means and the image plane velocity have opposite arithmetic signs.

6. An automatic focus adjustment device for adjusting a focus position to focus a moving subject image plane, comprising:

a phototaking lens assembly that forms a subject image plane from light rays from a photographic subject;

lens driver means coupled to said phototaking lens assembly for driving said phototaking lens assembly a forwarding amount to the focus position;

detection means for periodically detecting a defocus amount of the subject image plane formed by said phototaking lens assembly;

control means coupled to said detection means for determining the defocus amount and a velocity of the subject image plane, said control means determines the velocity of the subject image plane based on the defocus amount detected by said detection means, wherein said control means determines whether the subject image plane is moving based upon the determined velocity of the subject image plane and reduces an absolute value of the moving velocity when the defocus amount detected by said detection means and the computed image plane velocity of the subject image plane have opposite arithmetic signs and the defocus amount exceeds a predetermined amount; and lens driving control means coupled to said lens driver means and said control means for controlling said lens driver means based upon the defocus amount detected by said detection means and a computed velocity of the subject image plane.

7. An automatic focus adjustment device for adjusting a focus position to focus a moving subject image plane, comprising:

a phototaking lens assembly that forms a subject image plane from light rays from a photographic subject;

lens driver means coupled to said phototaking lens assembly for driving said phototaking lens assembly a forwarding amount to the focus position;

detection means for periodically detecting a defocus amount of the subject image plane formed by said phototaking lens assembly;

control means coupled to said detection means for determining the defocus amount and a velocity of the subject image plane, said control means determines the velocity of the subject image plane based on the defocus amount detected by said detection means, wherein said control means determines whether the subject image plane is moving based upon the determined velocity of the subject image plane and reduces an absolute value of the moving velocity when the defocus amount detected by said detection means and the computed image plane velocity of the subject image plane have opposite arithmetic signs; and lens driving control means coupled to said lens driver means and said control means for controlling said lens driver means based upon the defocus amount detected by said detection means and a computed velocity of the subject image plane.

8. A method for automatically adjusting a focus position to focus a moving subject image plane using an automatic focus adjustment device, the device includes a phototaking lens assembly that forms a subject image plane from light rays from a photographic subject, a photographic lens driver assembly coupled to the phototaking lens assembly that moves the phototaking lens assembly a forwarding amount to the focus position, a focus detection assembly that periodically detects a defocus amount of the subject image plane formed by the phototaking lens assembly, an adjustment controller coupled to the focus detection assembly that determines the defocus amount and determines a velocity of the subject image plane, and a lens driving controller coupled to the photographic lens driver assembly and the adjustment controller that controls the photographic lens driver assembly, said method comprising the steps of:

periodically detecting with the focus detection assembly a defocus amount of a subject image plane formed by the phototaking lens assembly;

determining an image plane velocity of the subject image plane based on sequential changes of the defocus amount;

determining whether the subject image plane is moving based upon the determined velocity of the subject image plane;

comparing with the adjustment controller arithmetic signs of the detected defocus amount and the determined image plane velocity; and adjusting the focus position of the phototaking lens assembly by controlling the operation of the photographic lens driver assembly based upon the detected defocus amount and the determined image plane velocity.

9. The method according to claim 10, further comprising the step of adjusting a drive instruction amount corresponding to the defocus amount to be given to the photographic lens driver assembly for controlling adjustment of the focus position when the detected defocus amount and the determined image plane velocity have opposite arithmetic signs.

10. The method according to claim 10, further comprising the step of reducing an absolute value of the moving velocity of the subject image plane when the detected defocus amount and the determined image plane velocity have opposite arithmetic signs and the defocus amount exceeds a predetermined amount.

11. The method according to claim 10, further comprising the step of reducing an absolute value of the moving velocity of the subject image plane when the detected defocus amount and the determined image plane velocity have opposite arithmetic signs.

12. A method for automatically adjusting a focus position to focus a moving subject image plane comprising the steps of:

periodically detecting a defocus amount of a subject image plane formed by a phototaking lens assembly;

determining an image plane velocity of the subject image plane based on sequential changes of the defocus amount; determining whether the subject image plane is moving;

comparing the arithmetic signs of the detected defocus amount and the determined image plane velocity; and adjusting the focus position of the phototaking lens assembly based upon the detected defocus amount and the determined image plane velocity.

13. The method according to claim 12, further comprising the step of adjusting a drive instruction amount corresponding to the defocus amount for controlling adjustment of the focus position when the detected defocus amount and the determined image plane velocity have opposite arithmetic signs.

14. The method according to claim 12, further comprising the step of reducing an absolute value of the moving velocity of the subject image plane when the detected defocus amount and the computed image plane velocity have opposite arithmetic signs and the defocus amount exceeds a predetermined amount.

15. The method according to claim 12, further comprising the step of reducing an absolute value of the moving velocity of the subject image plane when the detected defocus amount and the computed image plane velocity have opposite arithmetic signs.

16. The automatic focus adjustment device according to claim 2, wherein said focus detection assembly includes a photo-electric conversion element.

17. The automatic focus adjustment device according to claim 3, wherein said focus detection assembly includes a photo-electric conversion element.

* * * * *